(12) United States Patent
Kim

(10) Patent No.: US 7,375,448 B2
(45) Date of Patent: May 20, 2008

(54) MOTOR

(75) Inventor: Sang Uk Kim, Seoul (KR)

(73) Assignee: G & W Technologies, Inc., Incheon (KR)

( * ) Notice: Subject to any disclaimer, the term of this patent is extended or adjusted under 35 U.S.C. 154(b) by 0 days.

(21) Appl. No.: 11/784,467

(22) Filed: Apr. 5, 2007

(65) Prior Publication Data
US 2007/0188035 A1 Aug. 16, 2007

Related U.S. Application Data

(62) Division of application No. 10/982,084, filed on Nov. 4, 2004, now Pat. No. 7,202,583.

(30) Foreign Application Priority Data

| Nov. 5, 2003 | (KR) | ................ 2003-78040 |
| Jun. 16, 2004 | (KR) | ................ 2004-44510 |

(51) Int. Cl.
*H02K 5/16* (2006.01)

(52) U.S. Cl. ........................................ 310/90
(58) Field of Classification Search ............. 310/90, 310/90.5; 384/100
See application file for complete search history.

(56) References Cited

U.S. PATENT DOCUMENTS

| 5,598,048 | A | * | 1/1997 | Dunfield et al. ........... 310/90.5 |
| 5,969,448 | A |  | 10/1999 | Liu et al. |
| 6,339,270 | B1 |  | 1/2002 | Ichiyama |
| 6,876,112 | B2 |  | 4/2005 | Kull |
| 6,897,585 | B2 | * | 5/2005 | Lee et al. ........................ 310/90 |
| 6,917,130 | B2 |  | 7/2005 | Aiello et al. |
| 6,946,764 | B2 |  | 9/2005 | LeBlanc et al. |
| 6,965,493 | B2 |  | 11/2005 | Obara |
| 7,202,583 | B2 | * | 4/2007 | Kim ............................ 310/90 |

* cited by examiner

*Primary Examiner*—Dang Le
*Assistant Examiner*—Nguyen Hanh
(74) *Attorney, Agent, or Firm*—Thelen Reid Brown Raysman & Steiner LLP

(57) ABSTRACT

A motor having a fluid dynamic bearing generating a fluid dynamic pressure by forming an oil gap between a rotor and a stator such that oil is accommodated in the oil gap, and a first and second air dynamic bearing generating an air dynamic pressure by forming an air gap between the rotor and the stator such that air is introduced into the air gap. The fluid dynamic bearing generates a fluid dynamic pressure by forming an oil gap between an axial hole of a sleeve and a shaft such that oil is accommodated in the oil gap, and the first and second air dynamic bearings generate an air dynamic pressure by forming an air gap between an inner circumferential surface of a hub and an outer circumferential surface of the sleeve and between the inner circumferential surface of the hub and an upper plane surface of the sleeve, respectively.

4 Claims, 6 Drawing Sheets

US 7,375,448 B2

MOTOR

This application is a divisional application of, and claims the priority to U.S. application Ser. No. 10/982,084, entitled "Motor" filed on Nov. 4, 2004 now U.S. Pat. No. 7,202,583, which claims the priority of Korean Patent Application Nos. 2003-78040, filed on Nov. 5, 2003 and 2004-44510, filed on Jun. 16, 2004, in the Korean Intellectual Property Office, the disclosures of which are incorporated herein by reference.

BACKGROUND OF THE INVENTION

1. Field of the Invention

The present invention relates to a motor, and more particularly, to a motor that can prevent dry friction caused during initial operation and discharge static electricity generated during operation by employing both an air dynamic bearing and a fluid dynamic bearing that uses oil of predetermined viscosity. The present invention also relates to a motor having an improved load support force that can bear the load of a plurality of platters for recording and/or collecting a great amount of information.

2. Description of the Related Art

Recently, hard disk drives (ADDS) are required to have a high capacity as multimedia is increasingly used. In particular, HDDs for servers in which a great amount of information is exchanged and stored have always been required to have a large capacity.

High capacity HDDs can be realized by increasing the recording density of a platter or the number of platters. Low non-repeatable runout (NRRO) is needed for increasing the recording density of a platter. Developing a fluid dynamic bearing, which is substituted for a conventional ball bearing, has achieved considerable success in reducing NRRO.

When only a fluid dynamic bearing is used, however, the viscosity of oil is reduced due to frictional heat generated in the oil during a high speed rotation, thereby decreasing the load support force of the fluid dynamic bearing and deteriorating the performance of a motor.

Meanwhile, an air dynamic bearing does not change product properties, for example, a load support force, due to frictional heat during a high speed rotation, but causes dry friction during initial operation of the motor, thereby obstructing smooth operation.

FIG. 1 is a cross-sectional view of a conventional motor employing an air dynamic bearing 1. When the motor rotates at high speed while maintaining a narrow clearance of several micrometers between a bearing shaft 2 and a sleeve 3 or between both ends of the sleeve 3 and thrust plates 4 and 5, the air dynamic bearing 1 supports a load by forming an air pressure using air introduced into the clearance.

However, since such air does not function as a path through which static electricity generated in a disk of a HDD moves, the static electricity cannot be outwardly discharged.

SUMMARY OF THE INVENTION

The present invention provides a motor, which can reduce initial dry friction of an air dynamic bearing that rotates a rotating part using an air dynamic pressure generated in a clearance between a fixed part and the rotating part of a motor. The present invention also provides a motor, which can ensure a stable operation by smoothly discharging static electricity generated by air friction in a clearance of an air dynamic bearing.

The present invention also provides a motor having an improved load support force, which can ensure a stable operation even when a high capacity hard disk drive (HDD) is realized by increasing the number of platters that are coupled to and rotate together with a hub.

According to an aspect of the present invention, there is provided a motor comprising: a stator; and a rotor rotatably supported on the stator using bearing means, wherein the bearing means comprises: a fluid dynamic bearing generating a fluid dynamic pressure by forming an oil gap between the rotor and the stator such that oil is accommodated in the oil gap; and a first and second air dynamic bearing generating an air dynamic pressure by forming an air gap between the rotor and the stator such that air is introduced into the air gap.

The stator may comprise a housing, a sleeve fixed to a central portion of the housing and having an axial hole formed at a central portion thereof and a core fixed around the central portion of the housing and having a coil wound around it, and the rotor may comprise a shaft rotatably inserted into the axial hole, and a hub coupled to an upper end portion of the shaft and having a downwardly extending portion to an inner surface of which a magnet generating an electromagnetic force due to an interaction with the core is attached, wherein the fluid dynamic bearing generates a fluid dynamic pressure by forming an oil gap between the axial hole of the sleeve and the shaft such that oil is accommodated in the oil gap, and the first and second air dynamic bearings generate an air dynamic pressure by forming an air gap between an inner circumferential surface of a hub and an outer circumferential surface of the sleeve and between the inner circumferential surface of the hub and an upper plane surface of the sleeve, respectively.

The motor may further comprise: circular upper and lower thrust plates respectively fixed to upper and lower portions of the shaft, and receiving grooves formed on an inner portion of the sleeve and accommodating the upper and lower thrust plates to form fluid dynamic bearing surfaces.

The motor may further comprise a hydrodynamic pressure cover rotatably coupled to the shaft and fixed to an upper end of the inner portion of the sleeve, the hydrodynamic pressure cover forming an oil gap between a top surface of the upper thrust plate and an outer surface of the shaft and having a plurality of inclined grooves formed at regular intervals on an inner portion thereof.

The motor may further comprise fluid passage grooves formed on top and bottom surfaces of each of the upper and lower thrust plates to generate a hydrodynamic pressure by forming oil passages, and oil grooves formed on inner portions of the upper and lower thrust plates to store oil and collect air bubbles between the upper and lower thrust plates and the shaft.

The motor may further comprise: an inwardly extending hollow flange formed at the central portion of the housing and having an outer circumferential surface to which the core is fixed; and a cover block inserted into a hollow space of the flange and supporting a lower end portion of the shaft, the lower thrust plate, and a lower portion of the sleeve.

The motor may further comprise flow grooves formed on at least one of an inner circumferential surface of the sleeve and an outer circumferential surface of the shaft to generate a fluid dynamic pressure by guiding oil and form the fluid dynamic bearing, and air grooves formed on at least one of the inner circumferential surface of the hub and the outer circumferential surface of the sleeve to generate an air dynamic pressure by guiding introduced air and form the air dynamic bearing.

The air dynamic bearing may comprise: a first air dynamic bearing generating an air dynamic pressure in a clearance between the outer circumferential surface of the sleeve and the inner circumferential surface of the hub to support the hub in a radial direction; and a second air dynamic bearing generating an air dynamic pressure in a clearance between an upper plane surface of the sleeve and an inner circumferential surface of the hub corresponding to the upper plane surface to support the hub in a thrust direction.

When a length of a journal fluid dynamic bearing formed between the sleeve and the shaft is L, a clearance of the journal fluid dynamic bearing is F, and a diameter of the journal fluid dynamic bearing is E, a length of a journal air dynamic bearing formed between the outer circumferential surface of the sleeve and the inner circumferential surface of the hub may range from 0.4 to 0.8 L, a clearance of the journal air dynamic bearing may range from 1.3 to 1.5 F, and a diameter of the journal air dynamic bearing may range from 6 to 8 E.

According to another aspect of the present invention, there is provided a motor comprising: a housing fixed to a lower fixed body and having an inner central portion to which a core with a coil wound around it is fixed; a fixed block having one end fixed to a center of the housing and also having other end on which a coupling groove is formed; a shaft disposed at a center of the coupling groove and having a lower end fixed to the fixed block; a sleeve rotatably coupled to the shaft to form a fluid dynamic bearing by forming an oil gap between the sleeve and the shaft, and also rotatably coupled to the coupling groove; a hub having a central portion coupled to the sleeve to rotate together with the sleeve and having a downwardly extending portion to an inner surface of which a magnet generating an electromagnetic force due to an interaction with the core is attached, the hub forming an air gap between the hub and an outer surface of the fixed block and between the hub and a top surface of the fixed block to form an air dynamic pressure; circular first and second thrust plates respectively fixed to upper and lower portions of the shaft and forming fluid dynamic bearing surfaces between the first and second thrust plates and the sleeve; and an upper end cap fixed to an upper end portion of the sleeve and rotatably supported on an upper end of the shaft.

The upper end cap may have an annular shape to be rotatably coupled to the shaft, and the upper end of the shaft is fixed to an upper fixed body.

Accordingly, since the motor employs both the air dynamic bearing and the fluid dynamic bearing, it can prevent dry friction caused during initial operation, and, when being applied to a hard disk drive (HDD), it can outwardly discharge static electricity generated within a disk, thereby ensuring a stable operation.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A motor employs both an air dynamic bearing and a fluid dynamic bearing using oil of predetermined viscosity to minimize friction caused during initial operation and smoothly discharge static electricity generated during operation, thereby improving operating characteristics.

The present invention will now be described more fully with reference to the accompanying drawings, in which preferred embodiments of the invention are shown.

Figure 1:
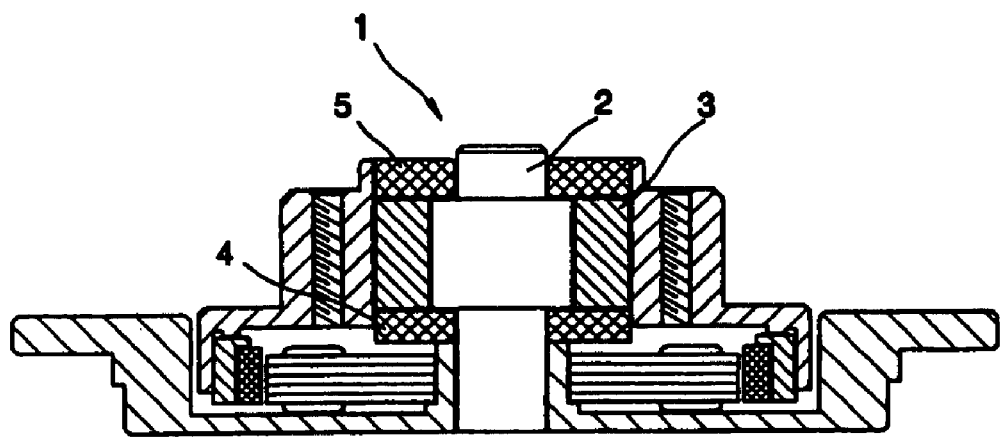
FIG. 1 is a schematic cross-sectional view of a conventional motor employing an air dynamic bearing.
Figure 2:
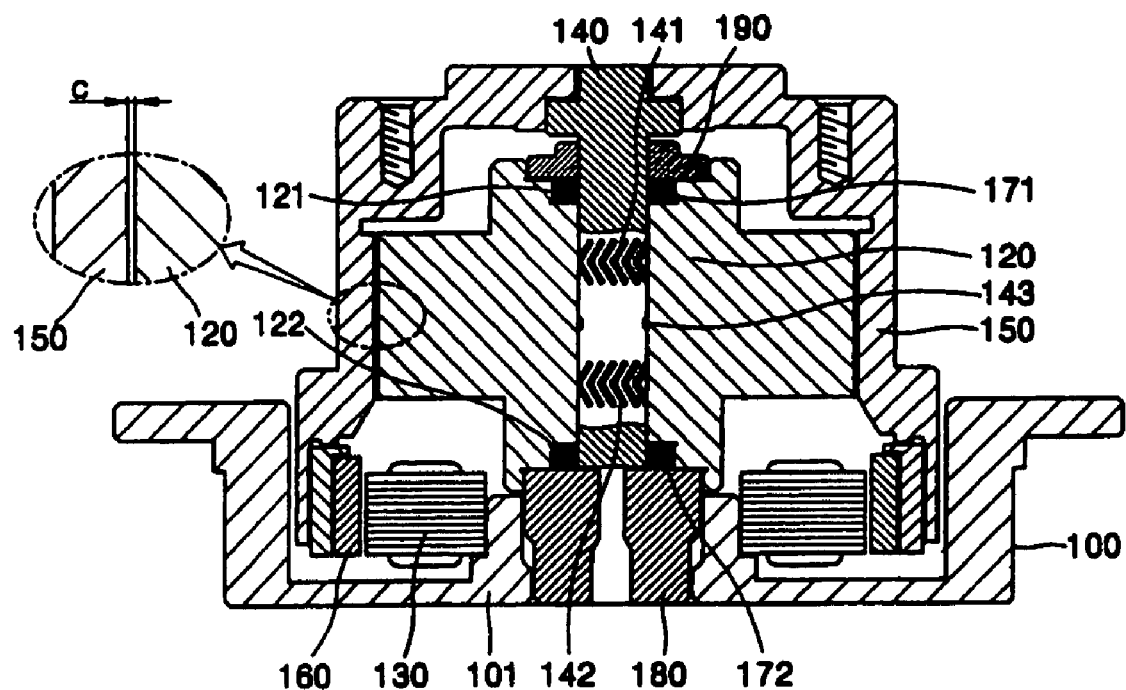
FIG. 2 is a schematic cross-sectional view of a motor according to an embodiment of the present invention.

Referring to FIG. 2 illustrating a motor according to an embodiment of the present invention, a rotor is rotatably supported on a stator by bearing means.

The bearing means includes a fluid dynamic bearing, which generates a fluid dynamic pressure by forming an oil gap between the rotor and the stator auth that oil is accommodated in the oil gap, an air dynamic bearing, which generates an air dynamic pressure by forming an air gap between the rotor and the stator such that air is introduced into the air gap.

The stator is constituted by a housing 100, a sleeve 120 fixed to a central portion of the housing 100 and having an axial hole formed at a central portion thereof, and a core 130 fixed around the central portion of the housing 100 and having a coil wound around it. The sleeve 120 is fixed to a cover block 180 (describes later), and the cover block 180 is press-fitted into the central portion of the housing 100.

The rotor is constituted by a shaft 140 rotatably inserted into the axial hole of the sleeve 120, and a hub 150 fixed to an upper end portion of the shaft 140 and having a downwardly extending portion to an inner surface of which a magnet 160 generating an electromagnetic force due to an interaction with the core 130 is attached.

The fluid dynamic bearing is formed between the axial hole of the sleeve 120 and the shaft 140, and the air dynamic bearing is formed between an inner circumferential surface of the hub 150 and an outer circumferential surface of the sleeve 120.

The fluid dynamic bearing and the air dynamic bearing will now be explained in further detail.

Figure 8:
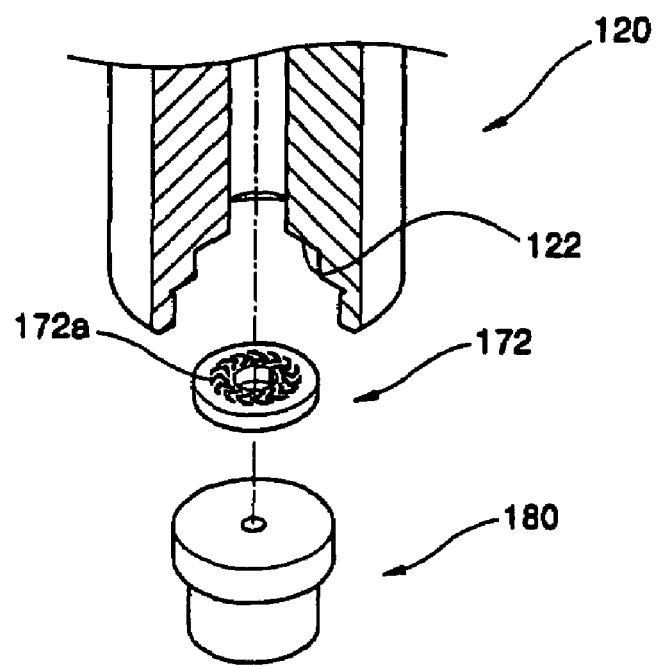
FIG. 8 is a schematic view illustrating essential parts of the motor according to the present invention.

As shown in FIGS. 2 and 8, the motor of the present embodiment further includes circular upper and lower thrust plates 171 and 172 respectively fixed to upper and lower portions of the shaft 140, and receiving grooves 121 and 122 formed on an inner portion of the sleeve 120 to accommodate the upper and lower thrust plates 171 and 172.

Further, an inwardly extending hollow flange 101 is formed at the central portion of the housing 100 and has an outer circumferential surface to which the core 130 is fixed. The cover block 180 is inserted into a hollow space of the flange 101 to support a lower end portion of the shaft 140, the lower thrust plate 172, and a lower end portion of the sleeve 120.

Flow grooves 141 and 142 are formed on upper and lower portions of an outer circumferential surface of the shaft 140 to generate a fluid dynamic pressure using injected oil. Here, flow grooves may be formed on the inner portion of the sleeve 120 corresponding to the flow grooves 141 and 142 to induce a fluid dynamic pressure.

Figure 6:
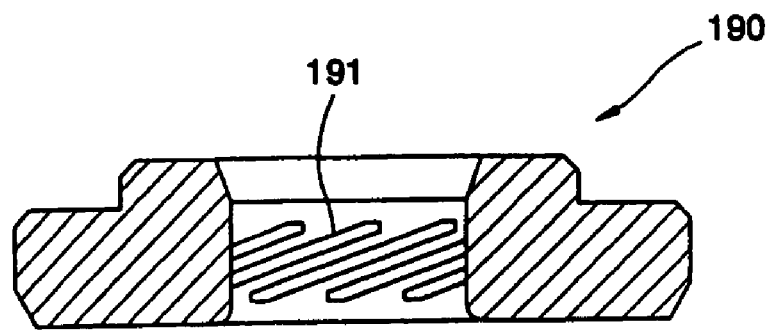
FIG. 6 is a schematic cross-sectional view of a hydrodynamic pressure cover employed in the motor according to the present invention.

Referring to FIGS. 2 and 6, a hydrodynamic pressure cover 190 is disposed on an upper end of the inner portion of the sleeve 120 to increase an inner pressure of a journal portion and prevent oil leakage. The hydrodynamic pressure cover 190 is coupled to an upper end portion of an inner surface of the sleeve 120 to form an oil gap with a top surface of the upper thrust plate 171 and has a plurality of inclined grooves 191 formed at regular intervals on an inner portion thereof.

When the shaft 140 rotates, since oil is guided toward lower end portions of the inclined grooves 191 of the hydrodynamic pressure cover 190 under a predetermined pressure, oil leakage is prevented and an internal pressure is enhanced, thereby generating a stable fluid dynamic pressure.

In the meantime, fluid passage grooves 171a and 172a are formed on top and bottom surfaces of each of the upper and lower thrust plates 171 and 172 to generate a hydrodynamic pressure by forming oil passages.

Further, fluid passage grooves may be formed on a bottom surface of the hydrodynamic pressure cover 190 and the sleeve 120 respectively facing the top and bottom surfaces of the upper thrust plate 171 to generate a hydrodynamic pressure by forming oil passages.

Fluid passage grooves may also be formed on the sleeve 120 and a top surface of the cover block 180 respectively facing the top and bottom surfaces of the lower thrust plate 172 to generate a hydrodynamic pressure by forming oil passages.

Figure 7:
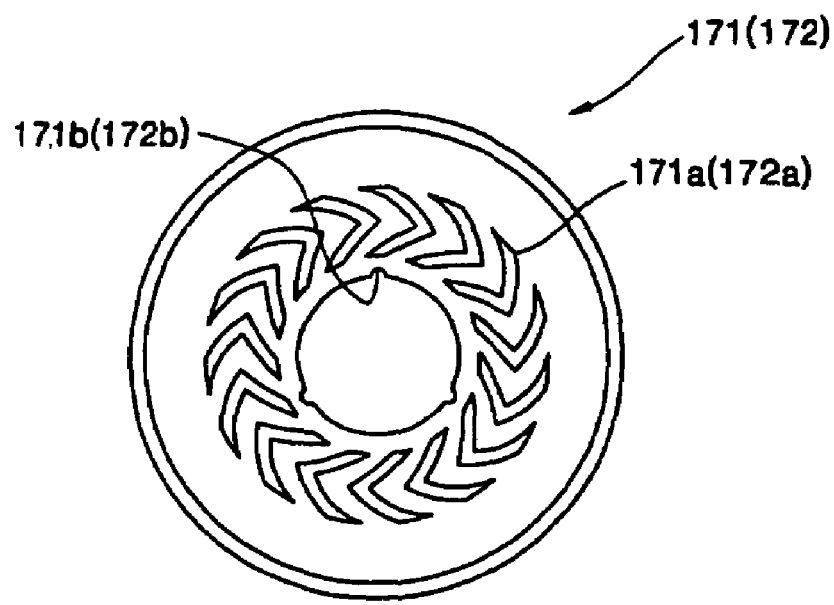
FIG. 7 is a plan view of a thrust plate employed in the motor according to the present invention.

In the meanwhile, as shown in FIG. 7, oil grooves 171b and 172b are formed on inner portions of the upper and lower thrust plates 171 and 172 to store oil and collect air bubbles between the upper and lower thrust plates 171 and 172 and the shaft 140. Since the oil grooves 171b and 172b are disposed at portions where a pressure is relatively lower than portions where a fluid dynamic pressure is generated during the rotation of the shaft 140, the oil grooves 171b and 172b can smoothly collect generated air bubbles.

Figure 3:
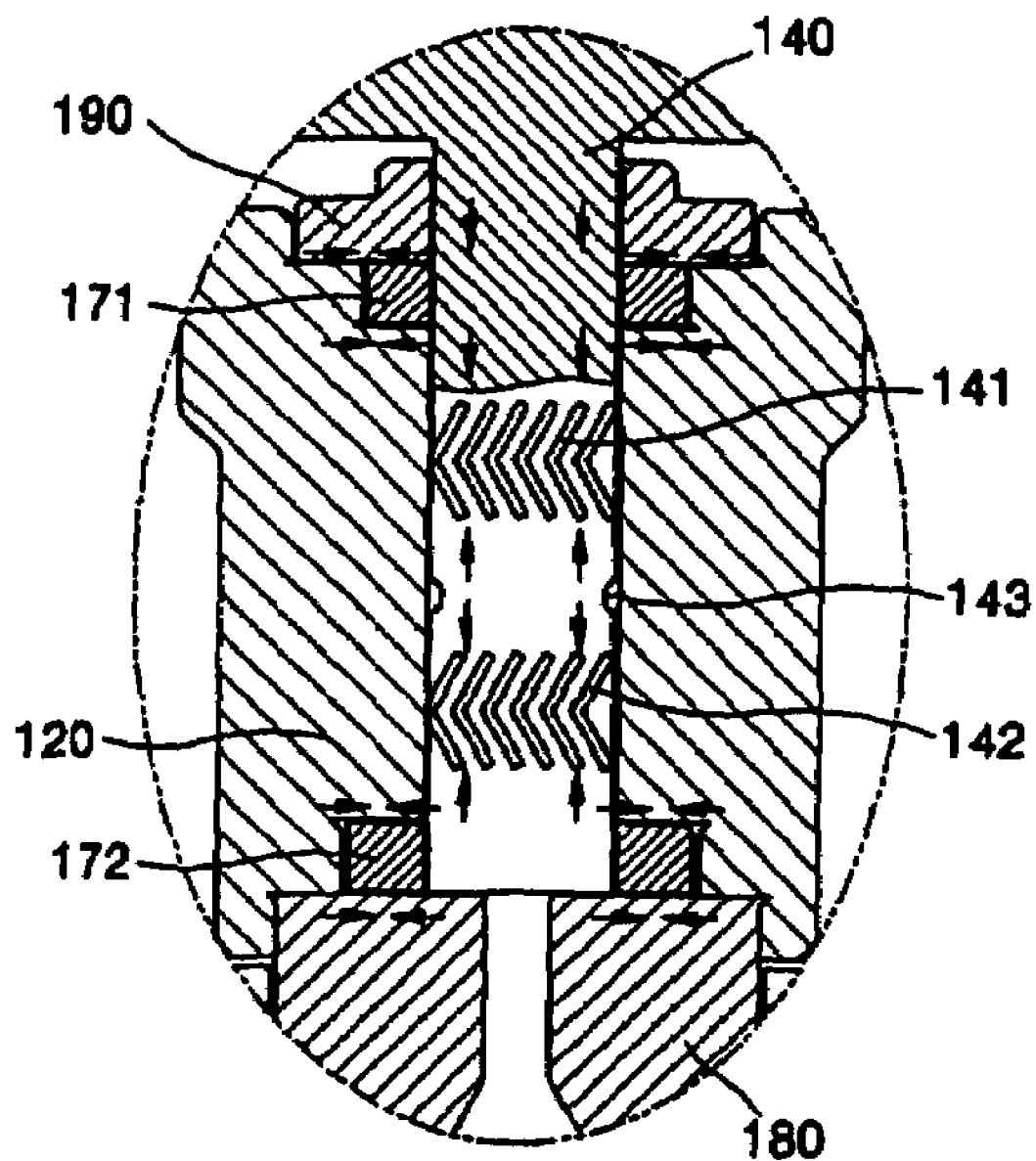
FIG. 3 is a schematic cross-sectional view oil flow in a fluid dynamic bearing employed in the motor shown in FIG. 2.

FIG. 3 is a cross-sectional view illustrating oil flow in the direction indicated by arrows during the rotation of the shaft 140. That is, when the shaft 140 rotates, oil dynamically converges into the flow grooves 141 and 142 of the shaft 140, such that the flow grooves 141 and 142 have a high pressure, and an axial groove 143 formed between the upper and lower thrust plates 171 and 172, specifically, between the flow grooves 141 and 142 of the shaft 140, has a relatively low pressure.

Accordingly, when the shaft 140 rotates, oil moves to a higher pressure point, and generated micro air bubbles move to the upper and lower thrust plates 171 and 172 where a pressure is low to be stared in the oil grooves 171b and 172b.

Figure 5:
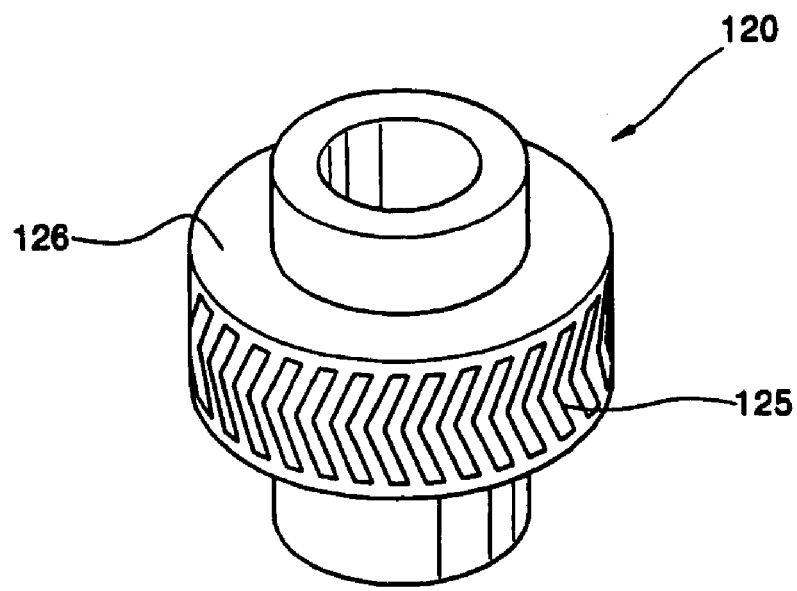
FIG. 5 is a perspective view of a sleeve employed in the motor according to the present invention.

Meanwhile, referring to FIGS. 2 and 5, the air dynamic bearing is made by a clearance C of several micrometers between the outer circumferential surface of the sleeve 120 and the inner circumferential surface of the hub 150. Herringbone air grooves 125 as formed on the outer circumferential surface of the shaft 140 are formed on the outer circumferential surface of the sleeve 120 or on the inner circumferential surface of the hub 150.

Figure 4:
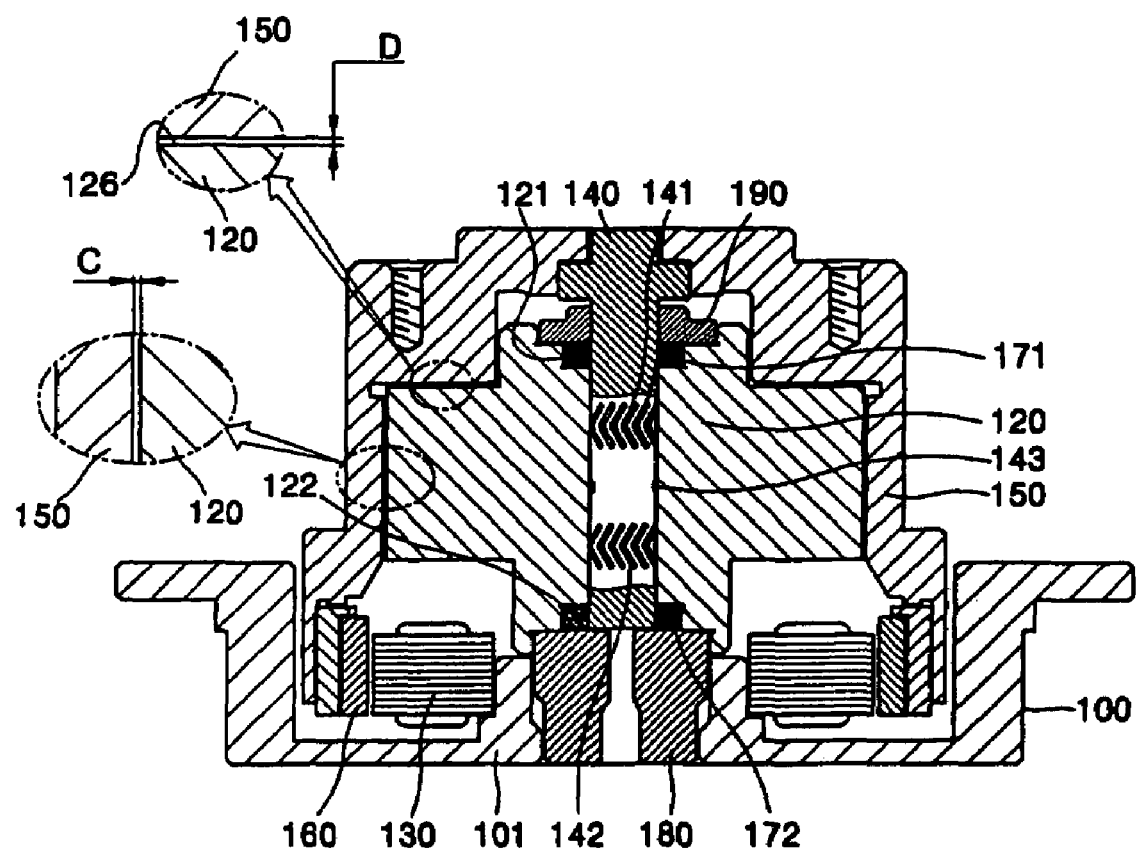
FIG. 4 is a schematic cross-sectional view of a motor according to another embodiment of the present invention.

FIG. 4 is a cross-sectional view of another embodiment of an air dynamic bearing. The air dynamic bearing includes a first air dynamic bearing made by the clearance C between the outer circumferential surface of the sleeve 120 and the inner circumferential surface of the hub 150, and a second air dynamic bearing made by a clearance D between an upper plane surface 126 of the sleeve 120 and an inner circumferential surface of the hub 150 corresponding to the upper plane surface 126 of the sleeve 120.

The first air dynamic bearing supports the hub 150 in a radial direction on the sleeve 120 using a dynamic pressure of air introduced into the clearance C. The second air dynamic bearing supports the hub 150 in a thrust direction on the sleeve 120 using a dynamic pressure of air introduced into the clearance D. Since other elements are similar to those of the embodiment illustrated in FIG. 2, a detailed explanation thereof will not be given.

If the core 130 employed in the motors constructed as above is turned on, the rotor constituted by the shaft 140, the hub 150, and the magnet 160 rotates relative to the stator constituted by the housing 100, the sleeve 120, and the core 130.

Oil filled between the fixed sleeve 120 and the rotating shaft 140 converges into the flow grooves 141 and 142 to form a high pressure and a fluid dynamic bearing.

A fluid dynamic bearing in a thrust direction is formed between the upper and lower thrust plates 171 and 172 and the sleeve 120.

The shaft 140 can rotate smoothly by virtue of the fluid dynamic bearing formed on the flow grooves 141 and 142 and the fluid dynamic bearing in the thrust direction.

Furthermore, since oil additionally flows toward the lower end portions of the inclined grooves 191 of the hydrodynamic pressure cover 190 due to the rotation of the shaft 140, an internal pressure between the sleeve 120 and the shaft 140 increases and oil leakage is prevented.

On the other hand, oil flowing in the oil gap due to the relative rotation of the shaft 140 forms oil passages indicated by arrows as shown in FIG. 3. That is, a relatively high pressure is generated at the flow grooves 141 and 142 of the shaft 140 to form a fluid dynamic bearing, and a relatively low pressure is generated at the axial groove 143 formed on a central side of the shaft 140 and at the upper and lower thrust plates 171 and 172 respectively positioned on upper and lower sides of the shaft 140 to collect generated micro air bubbles. At this time, the oil grooves 171b and 172b of the upper and lower thrust plates 171 and 172 guide the oil and the air bubbles.

In the meantime, during the operation of the motor, the fluid dynamic bearing and the air dynamic bearing operate together. That is, when the hub 150 rotates relative to the fixed sleeve 120, air introduced into the clearances C and D forms an air dynamic pressure through the air grooves 125 such that the hub 150 is supported in a radial direction on the sleeve 120.

Accordingly, during initial operation of the motor, dry friction between the sleeve 120 and the hub 150 that form the air dynamic bearing is prevented due to the fluid dynamic bearing around the shaft 140, and generated static electricity can be smoothly discharged through the oil used in the fluid dynamic bearing.

On the other side, the air dynamic bearing in the present embodiment has the clearance C equal to that of the journal fluid dynamic bearing, and has a diameter 6 to 8 times greater than that of the fluid dynamic bearing in order to obtain the same characteristics and load support force as the fluid dynamic bearing.

A length of the air dynamic bearing is determined to be within a range where the air dynamic bearing has no interference in the air dynamic bearing clearance C when the shaft 140 is inclined in the fluid dynamic bearing clearance on the basis of given fluid and air dynamic bearing clearances. When the length and tolerance of the air dynamic bearing are set on the basis, the following relations are obtained.

|  | Journal fluid dynamic bearing | Journal air dynamic bearing |
| --- | --- | --- |
| Diameter | E | 6~8 E |
| Clearance (μm) | F | 1.3~1.5 F |
| Length | L | 0.4~0.8 L |

When the air dynamic bearing and the fluid dynamic bearing are formed under the above conditions, initial dry friction is prevented from occurring in the air dynamic bearing, and the air dynamic bearing has the same operating characteristics and load support force as the fluid dynamic bearing.

The motor described as above may be configured such that the elements of the rotor are exchanged with the elements of the stator. That is, the magnet 160 may be fixed to the housing 100, and the core 130 may be installed on an inner circumferential surface of the hub 150.

Figure 9:
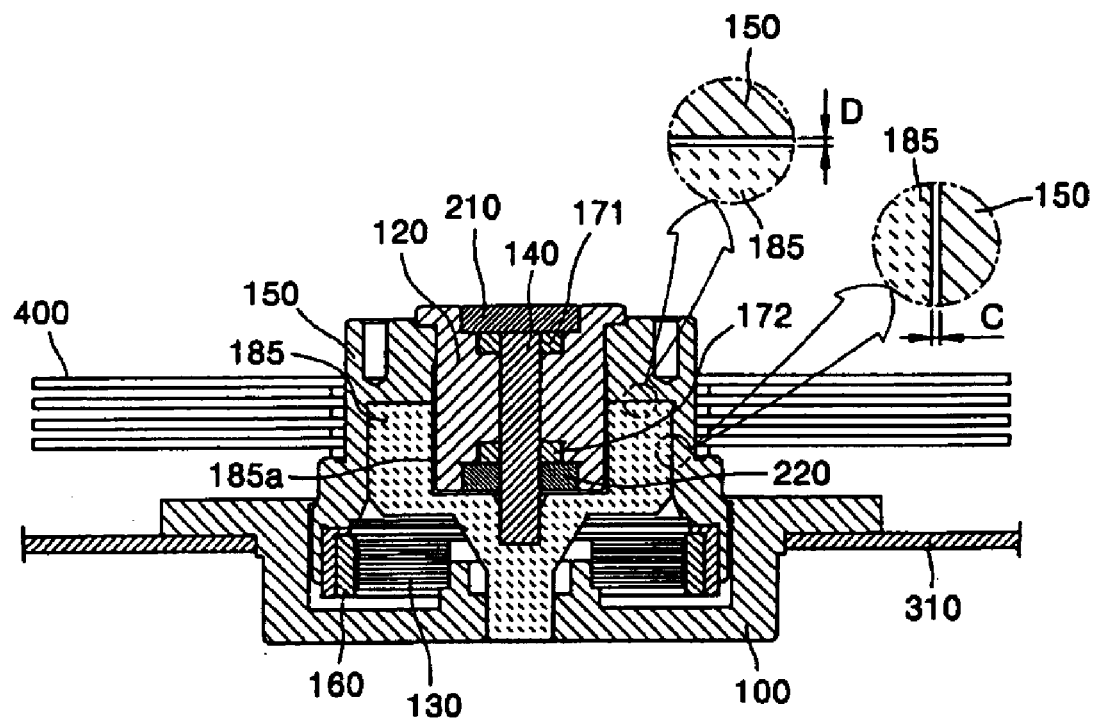
FIG. 9 is a schematic cross-sectional view of a shaft fixed-type motor according to still another embodiment of the present invention.
Figure 10:
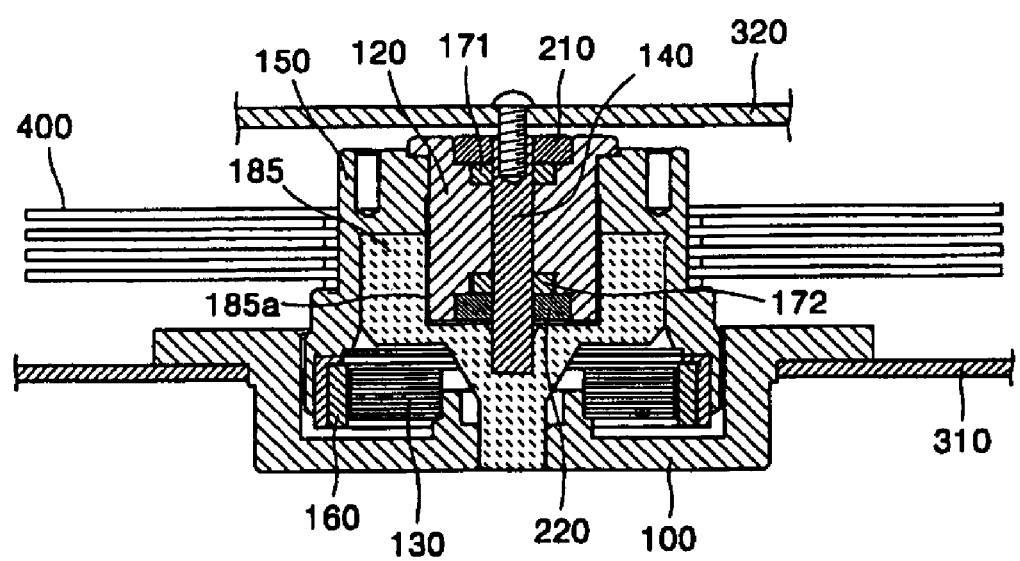
FIG. 10 is a schematic cross-sectional view of a motor according to yet another embodiment of the present invention.

FIGS. 9 and 10 are cross-sectional views of motors according to other embodiments of the present invention.

In the motors illustrated in FIGS. 9 and 10, one end or both ends of a shaft are fixed. Accordingly, when a plurality of platters are mounted on a hub and rotate together with the hub, a stable operation can be achieved despite of a high load. Also, since both an air dynamic bearing and a fluid dynamic bearing using oil of predetermined viscosity are employed, friction caused during initial operation is minimized and static electricity generated during operation is smoothly discharged, thereby improving operating characteristics of the motors.

Referring to FIG. 9 illustrating a shaft fixed-type motor according to another embodiment of the present invention, a rotor is rotatably supported on a stator including a shaft 140 by bearing means. The bearing means includes a fluid dynamic bearing, which generates a fluid dynamic pressure by forming an oil gap between the rotor and the stator such that oil is accommodated in the oil gap, and an air dynamic bearing, which generates an air dynamic pressure by forming an air gap between the rotor and the stator such that air is introduced into the air gap.

The stator includes a housing 100 fixed to a lower fixed body 310 and having an inner central portion to which a core 130 with a coil wound around it is fixed, a fixed block 185 having one end fixed to a center of the housing 100 and also having other end on which a coupling groove 185a is formed, the shaft 140 disposed at a center of the coupling groove 185a and having a lower end fixed to the fixed block 185, and circular first and second thrust plates 171 and 172 respectively fixed to upper and lower portions of the shaft 140 and forming fluid dynamic bearing surfaces between the first and second thrust plates 171 and 172 and a sleeve 120 (described later).

The rotor includes the sleeve 120 rotatably coupled to the shaft 140 to form a an oil gap and a fluid dynamic bearing with the shaft 140 and also rotatably coupled to the coupling groove 185a, a hub 150 having a central portion coupled to the sleeve 12 to rotate together with the sleeve 120 and also having a downwardly extending portion to an inner surface of which a magnet 160 generating an electromagnetic force due to an interaction with the core 130 is attached, the hub 150 forming an air gap C between the hub 150 and an outer surface of the fixed block 185 and an air gap D between the hub 150 and a top surface of the fixed block 185 to form an air dynamic bearing for generating an air dynamic pressure, and an upper end cap 210 fixed to an upper end portion of the sleeve 120 and rotatably supported on an upper end of the shaft 140.

Reference numeral 220 denotes a lower end cap fixed to the shaft 140. Flow grooves (not shown) may be formed on an outer circumferential surface of the lower end cap 220 to generate a fluid dynamic pressure between the lower end cap 220 and the sleeve 120.

The fluid dynamic bearing is formed between an axial hole of the sleeve 120 and the shaft 140, and the air dynamic bearings are formed between the outer surface of the fixed block 185 and an inner circumferential surface of the hub 150 and between the top surface of the fixed block 185 and the inner circumferential surface of the hub 150.

The sleeve 120 and the hub 150 are supported in a radial direction due to a dynamic pressure of air introduced into the air gap C, and the sleeve 120 and the hub 150 are supported in a thrust direction due to a dynamic pressure of air introduced into the air gap D.

In the meanwhile, referring to FIG. 10 illustrating a motor according to another embodiment of the present invention, both end portions of the shaft 140 are fixed such that upper and lower end portions of the shaft 140 are respectively fixed to upper and lower fixed bodies 310 and 320. Since other elements of the motor illustrated in FIG. 10 are similar to those of the motor illustrated in FIG. 9, a detailed explanation will not be given.

In the shaft-fixing type motors illustrated in FIGS. 9 and 10, since the shaft 140, which has a smaller diameter, a shorter length, and a less stiffness than other components, is used as a fixed body, and hub 150 on which a plurality of platters 400 are mounted is used as a rotating body, vibration or the like caused by stiffness reduction is prevented. Further, since the shaft 140 is used as the fixed body, stiffness is increased and the plurality of platters 400 can be mounted, making it possible to record a great amount of information.

If the core 130 employed in the motors described with reference to FIGS. 9 and 10 is turned on, the rotor constituted by the hub 150 and the sleeve 120 rotates relative to the stator constituted by the housing 100, the fixed block 185, the core 130, and the shaft 140.

Oil filled between the fixed shaft 140 and the rotating sleeve 120 converges into flow grooves (not shown) to form a high pressure and a fluid dynamic bearing.

A fluid dynamic bearing in a thrust direction is formed between the upper and lower thrust plates 171 and 172 and the sleeve 120.

The shaft 140 can smoothly rotate by virtue of the fluid dynamic bearing formed on the flow grooves (not shown) and the fluid dynamic bearing in the thrust direction.

On the other side, when the motor operates, the fluid dynamic gearing and the air dynamic bearing operate together. That is, when the hub 150 rotates relative to the fixed shaft 140, air introduced into the air gaps C and D forms an air dynamic pressure through air grooves (not shown), such that the hub 150 is supported in a radial direction or a thrust direction on the fixed block 185.

Accordingly, during initial operation of the motor, dry friction between the fixed block 185 and the hub 150 that form the air dynamic bearing is prevented due to the fluid dynamic bearing around the shaft 140, and generated static electricity can be smoothly discharged due to the oil used in the fluid dynamic bearing.

The flow grooves and the air grooves have a herringbone or spiral shape.

As described above, the motor according to the present invention has the following advantages.

First, since both the fluid dynamic bearing and the air dynamic bearing are employed, dry friction between the rotor and the stator is minimized during the operation of the motor and operating characteristics of the motor is improved. Second, since the static electricity generated due to air friction in the clearance of the air dynamic bearing is smoothly discharged, a stable operation of the motor is achieved.

Third, since the shaft 140, which has a smaller diameter, a shorter length, and a less stiffness than other components of the motor, is used as the fixed body and the hub 150 on which the plurality of platters 400 are mounted is used as the rotating body, vibration or the like caused by stiffness reduction is prevented. In addition, since the shaft 140 is used as the fixed body, stiffness is enhanced, and thus, the plurality of patters 400 can be mounted, thereby making it possible to record a great amount of information.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A motor comprising:
   a housing fixed to a lower fixed body and having an inner central portion to which a core with a coil wound around it is fixed;
   a fixed block having one end fixed to a center of the housing and also having other end on which a coupling groove is formed;
   a shaft disposed at a center of the coupling groove and having a lower end fixed to the fixed block;
   a sleeve rotatably coupled to the shaft to form a fluid dynamic bearing by forming an oil gap between the sleeve and the shaft, and also rotatably coupled to the coupling groove;
   a hub having a central portion coupled to the sleeve to rotate together with the sleeve and having a downwardly extending portion to an inner surface of which a magnet generating an electromagnetic force due to an interaction with the core is attached, a first air gap between the hub and an outer surface of the fixed block forming a first air dynamic bearing, a second air gap between the hub and a top surface of the fixed block forming a second air dynamic bearing, the first air dynamic bearing and the second air dynamic bearing generating an air dynamic pressure;
   circular first and second thrust plates respectively fixed to upper and lower portions of the shaft and forming fluid dynamic bearing surfaces between the first and second thrust plates and the sleeve; and
   an upper end cap fixed to an upper end portion of the sleeve and rotatably supported on an upper end of the shaft.

2. The motor of claim 1, wherein the upper end cap has an annular shape to be rotatably coupled to the shaft, and the upper end of the shaft is fixed to an upper fixed body.

3. The motor of claim 2, further comprising:
   an inwardly extending hollow flange formed at the central portion of the housing and having an outer circumferential surface to which the core is fixed; and
   a cover block inserted into a hollow space of the flange and supporting a lower end portion of the shaft, the lower thrust plate, and a lower portion of the sleeve.

4. The motor of claim 2, wherein when a length of a journal fluid dynamic bearing formed between the sleeve and the shaft is L, a clearance of the journal fluid dynamic bearing is F, and a diameter of the journal fluid dynamic bearing is E, a length of a journal air dynamic bearing formed between the outer circumferential surface of the sleeve and the inner circumferential surface of the hub ranges from 0.4 to 0.8 L, a clearance of the journal air dynamic bearing ranges from 1.3 to 1.5 F, and a diameter of the journal air dynamic bearing ranges from 6 to 8 E.

* * * * *